(12) United States Patent
Touchard et al.

(10) Patent No.: US 7,068,857 B1
(45) Date of Patent: Jun. 27, 2006

(54) METHOD AND DEVICE FOR PRESENTING DIGITAL IMAGES ON A LOW-DEFINITION SCREEN

(75) Inventors: Nicholas P. Touchard, Paris (FR); Olivier Seignol, Champs sur Marne (FR); Michel Buff, La Frette (FR); Jean-Marie Vau, Paris (FR)

(73) Assignee: Eastman Kodak Company, Rochester, NY (US)

( * ) Notice: Subject to any disclaimer, the term of this patent is extended or adjusted under 35 U.S.C. 154(b) by 1043 days.

(21) Appl. No.: 09/638,746

(22) Filed: Aug. 14, 2000

(30) Foreign Application Priority Data

Feb. 24, 2000 (FR) .................................... 0002458

(51) Int. Cl.
*G06K 9/32* (2006.01)

(52) U.S. Cl. ...................... 382/299; 382/275; 382/298; 345/733; 345/744

(58) Field of Classification Search ................ 382/251, 382/260, 263, 264, 294, 277, 278, 282, 286, 382/293, 295, 298, 299, 305, 308, 164, 165, 382/167, 275, 219; 345/1.2, 2.1, 2.2, 2.3, 345/3.3, 3.4, 4, 698, 699, 538, 214, 733, 345/734, 744; 358/401, 405, 451, 452; 348/14.02, 14.03, 14.05, 14.07, 333.02, 333.12, 348/404.1; 455/92, 97, 98, 414.1, 556.1, 455/557, 566; 709/228, 229
See application file for complete search history.

(56) References Cited

U.S. PATENT DOCUMENTS

| | | | | |
|---|---|---|---|---|
| 5,153,936 A | * | 10/1992 | Morris et al. ................ | 345/428 |
| 5,613,051 A | * | 3/1997 | Iodice et al. ................ | 345/428 |
| 5,696,848 A | * | 12/1997 | Patti et al. .................. | 382/254 |
| 5,727,159 A | | 3/1998 | Kikinis ................... | 395/200.76 |
| 5,732,074 A | * | 3/1998 | Spaur et al. ................. | 370/313 |
| 5,806,005 A | * | 9/1998 | Hull et al. ................... | 455/566 |
| 5,825,936 A | * | 10/1998 | Clarke et al. ................ | 382/261 |
| 5,978,035 A | * | 11/1999 | Geshwind .................... | 348/441 |
| 5,982,371 A | * | 11/1999 | Burridge ..................... | 345/418 |
| 6,018,769 A | * | 1/2000 | Tezuka et al. ............... | 709/220 |
| 6,023,714 A | * | 2/2000 | Hill et al. .................... | 715/513 |
| 6,065,041 A | * | 5/2000 | Lum et al. ................... | 709/203 |
| 6,076,109 A | * | 6/2000 | Kikinis ........................ | 708/228 |
| 6,085,247 A | * | 7/2000 | Parsons et al. ............. | 709/227 |
| 6,101,445 A | * | 8/2000 | Alvarado et al. ............... | 702/9 |
| 6,167,442 A | * | 12/2000 | Sutherland et al. ......... | 709/217 |

(Continued)

FOREIGN PATENT DOCUMENTS

EP  0 889 636 A2  1/1999

(Continued)

OTHER PUBLICATIONS

U.S. Appl. No. 09/112,661, filed Jul. 9, 1998, Hsien-Che Lee et al.

(Continued)

*Primary Examiner*—Samir Ahmed
*Assistant Examiner*—Yosef Kassa
(74) *Attorney, Agent, or Firm*—David M. Woods (57) ABSTRACT

In order to present digital images on different types of screens, and especially on low definition screens, the system provides a server that is adapted for receiving messages coming from at least one display device, and a table for recognizing the type of display device with which the server is communicating. The server performs a transformation for adapting the definition of the image that is transmitted to the type of display screen that is recognized.

3 Claims, 6 Drawing Sheets

U.S. PATENT DOCUMENTS

| | | | |
|---|---|---|---|
| 6,205,485 B1 * | 3/2001 | Kikinis | 709/231 |
| 6,285,784 B1 * | 9/2001 | Spaulding et al. | 382/162 |
| 6,300,947 B1 * | 10/2001 | Kanevsky | 345/866 |
| 6,304,277 B1 * | 10/2001 | Hoekstra et al. | 345/600 |
| 6,353,448 B1 * | 3/2002 | Scarborough et al. | 715/744 |
| 6,381,343 B1 * | 4/2002 | Davis et al. | 382/112 |
| 6,388,732 B1 * | 5/2002 | Williams et al. | 355/40 |
| 6,430,311 B1 * | 8/2002 | Kumada | 382/162 |
| 6,430,624 B1 * | 8/2002 | Jamtgaard et al. | 709/246 |
| 6,504,956 B1 * | 1/2003 | Gannage et al. | 382/188 |
| 6,552,418 B1 * | 4/2003 | Misumi et al. | 257/666 |
| 6,563,513 B1 * | 5/2003 | Yu et al. | 345/698 |
| 6,654,814 B1 * | 11/2003 | Britton et al. | 709/246 |
| 6,684,257 B1 * | 1/2004 | Camut et al. | 709/246 |

FOREIGN PATENT DOCUMENTS

| | | |
|---|---|---|
| EP | 1 017 019 A2 | 7/2000 |
| WO | WO 97/44560 | 11/1997 |

OTHER PUBLICATIONS

U.S. Appl. No. 09/490,915, filed Jan. 25, 2000, Jiebo Luo et al.

"Neural Network-Based Face Detection" by Henry A. Rowley, Shumeet Baluja and Takeo Kanade. IEEE Transactions on Pattern Analysis and Machine Intelligence, vol. 20, No. 1, Jan. 1998.

* cited by examiner

METHOD AND DEVICE FOR PRESENTING DIGITAL IMAGES ON A LOW-DEFINITION SCREEN

FIELD OF THE INVENTION

The present invention relates to the presentation of digital images on a low-definition screen and more particularly on a cellular telephone screen.

BACKGROUND OF THE INVENTION

The development of the Internet is more and more making possible exchanges of messages electronically. Current technology has made possible the development of the digital image and the transfer of the images by means of a network such as for example the Internet. Currently, recent cellular telephones are provided with a screen which makes it possible to display messages. Such screens, for the moment, have only a few density levels and a small number of display pixels, in general around 96×44. Obviously colour screens are beginning to appear. Because of this, the number of colours which can be displayed is still relatively low. Under these circumstances, the direct display of a colour image of relatively high definition on this type of screen cannot be exploited visually and is of little advantage.

There is therefore a need for a device and method for displaying a monochrome representation, or one with a small number of colours, of a colour digital image on a cellular telephone screen having a small number of pixels and a small number of grey levels, possibly in each of the primary colours.

In the present application the expression "grey level" means discrete density, saturation or illumination steps or values according to the type of space concerned. This expression can even be used for colour images, each primary colour having a limited number of "grey levels"; this can also be referred to as the "depth of colour". The expression "relatively high definition" means an image with a number of pixels of at least approximately 640×480 and a depth of colour coded in approximately 8 bits.

The invention aims to provide to a cellular telephone an item of information processed so as to optimise the information transmitted as a function of the apparatus used for receiving this information.

Another aim of the invention is to automatically provide a display of "vignettes" resulting from the traditional commercial processing of silver photographic films on a cellular telephone screen.

SUMMARY OF THE INVENTION

The aims of the invention are achieved by means of a method of displaying a digital image contained in a database of a server on the screen of a display device. The method according to the invention comprises:

a) the determination by the server, on the establishment of a communication coming from the display device calling for the display of a digital image in the base, of the type of screen associated with the display device on which the image is to be received, b) the modification, before transmission, of the image to be transmitted by a transformation which is a function of the type of display screen, c) the transmission of the image modified by the transformation, and d) the display of this image on the screen of the display device. In an advantageous embodiment, the transformation also depends on the content of the image.

The aims of the invention are also achieved by a system of displaying a digital image on a display device provided with a screen with a relatively low number of pixels and depth of colour. The system is characterised in that it comprises:

a) a server adapted to receive messages coming from at least one display device, b) a recognition means of the display device type with which it communicates so as to determine the type of display screen used by the mobile device, and c) an image transformation means in order to adapt the definition of the image transmitted by the server to the type of display screen.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the preferred embodiments of the invention, reference being made to the drawings in which the same reference numerals identify the same elements of structure in each of the several figures.

Figure 1:
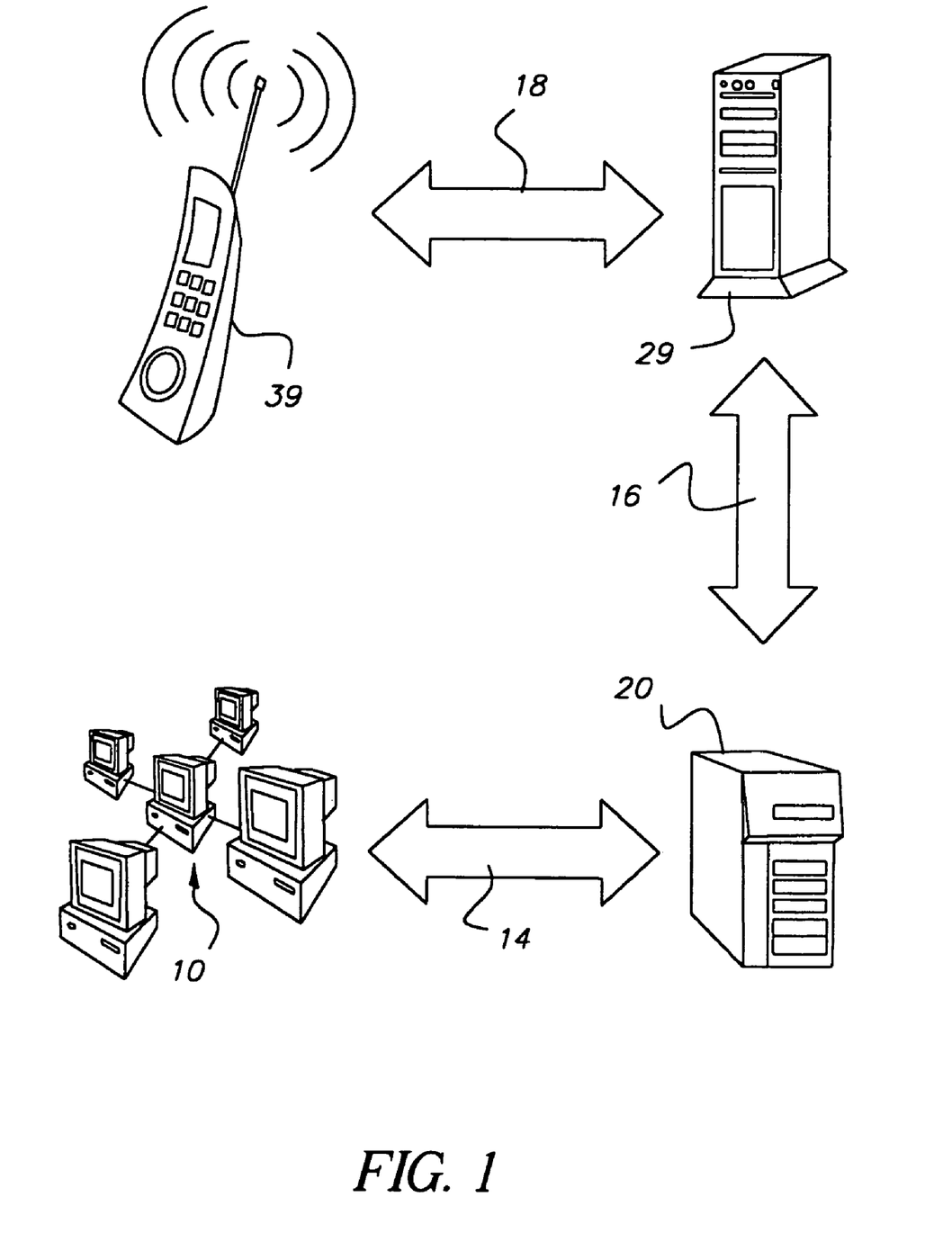
FIG. 1 depicts schematically the system for implementing the invention.

FIG. 1 depicts schematically a data server 10 containing digital images, for example displayed in an image base. The server 10 is connected by a high-throughput link 14 to a storage server 20 allowing connection to a network represented by the arrow 16, such as for example the Internet. The server 20 is connected to a gateway 29 of the WAP type intended to provide the communication depicted by the arrow 18 between a cellular telephone 39 provided with a display screen and the network, for example GSM or mobile. Obviously the present invention is described in connection with a cellular telephone provided with a screen and able to be connected to the network of the Internet type, but it also has advantages for any display device which can be connected to a network, for example of the Internet or GSM type, on which images can circulate and where the definition supplied by its display screen is relatively low both with regard to the number of pixels and the depth of colour.

Figure 3:
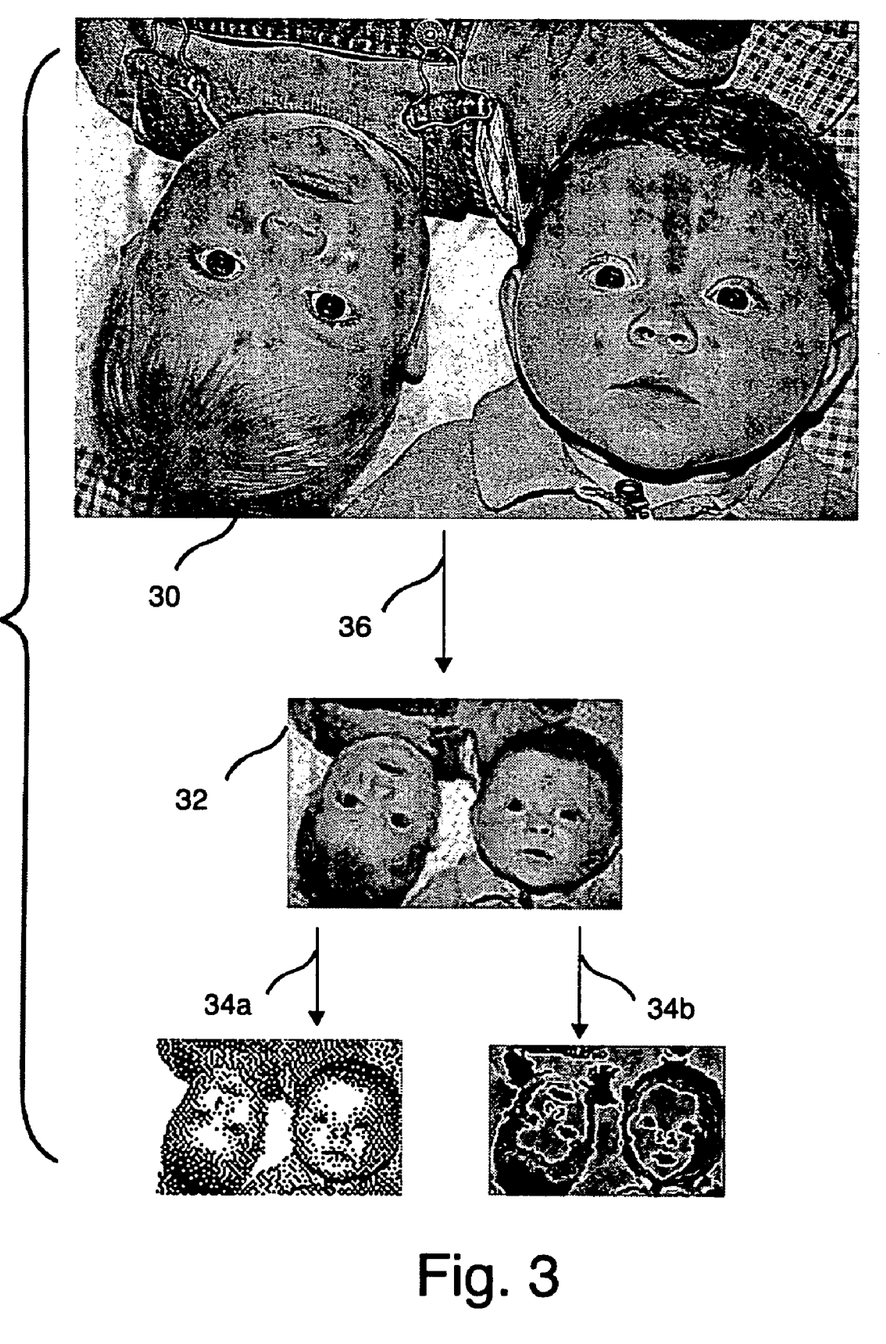
FIG. 3 depicts schematically the processing of a colour image before it is sent for display.
Figure 4:
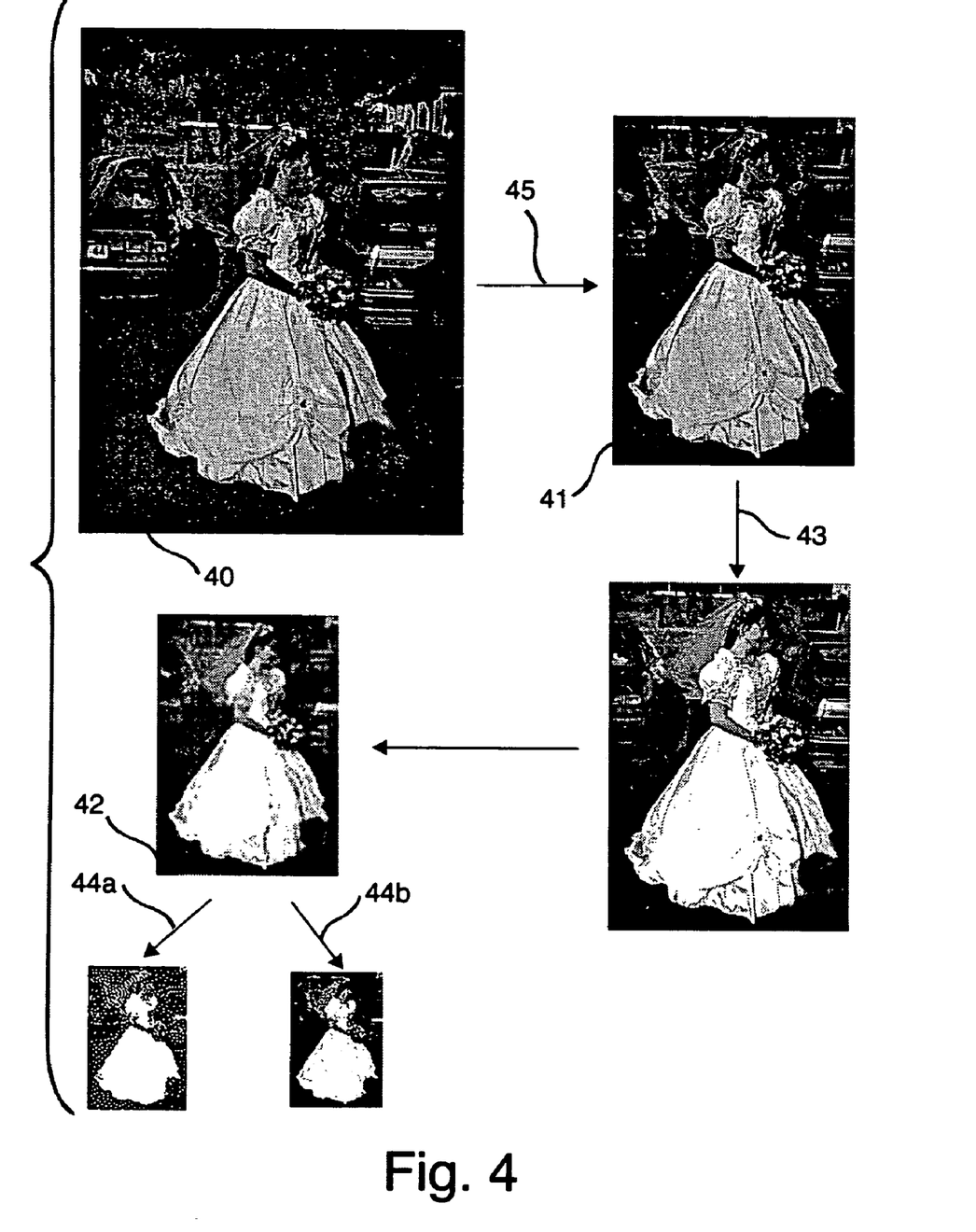
FIG. 4 depicts schematically another type of processing of a colour image before it is sent.
Figure 5:
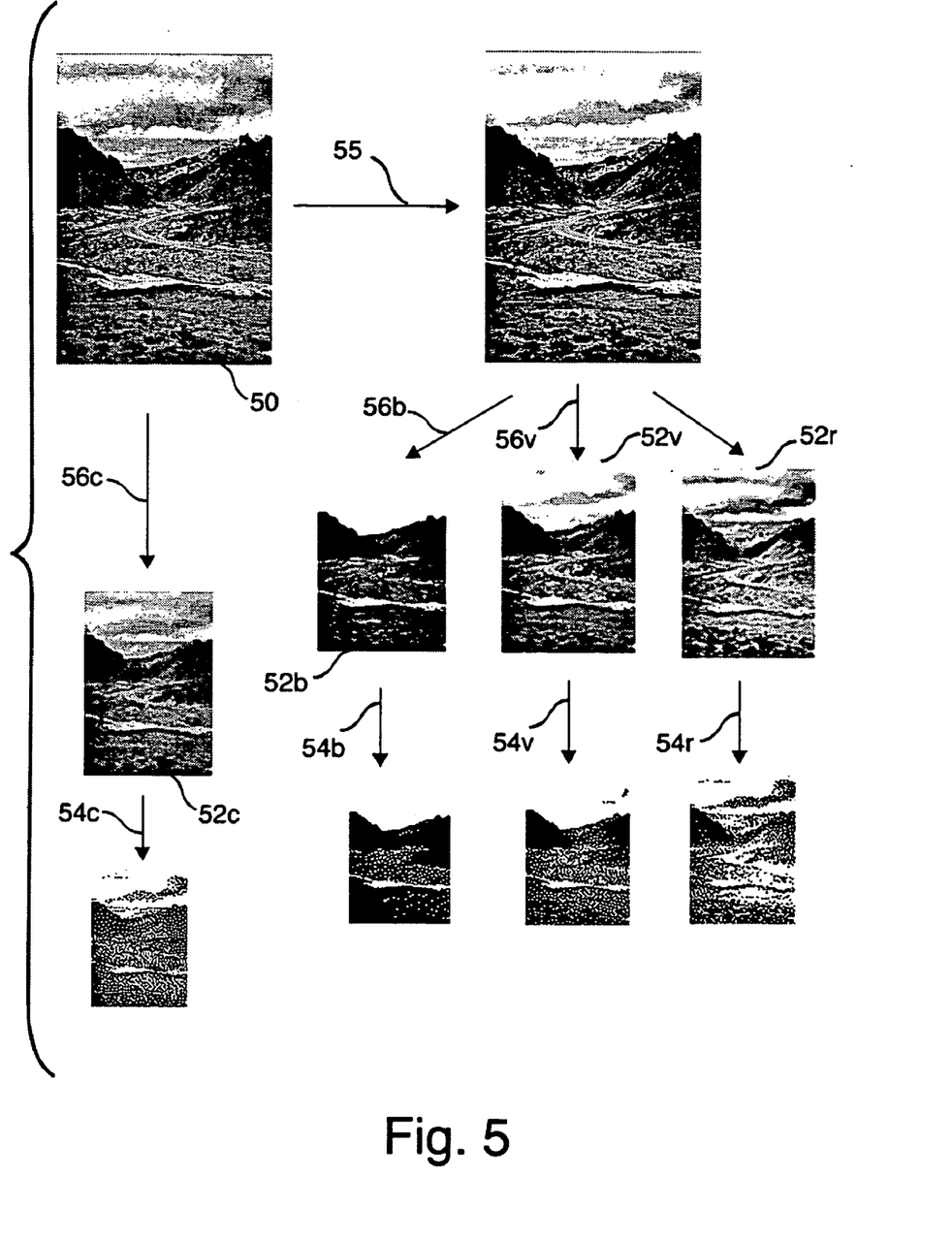
FIG. 5 depicts schematically another type of processing of a colour image before it is sent.
Figure 6:
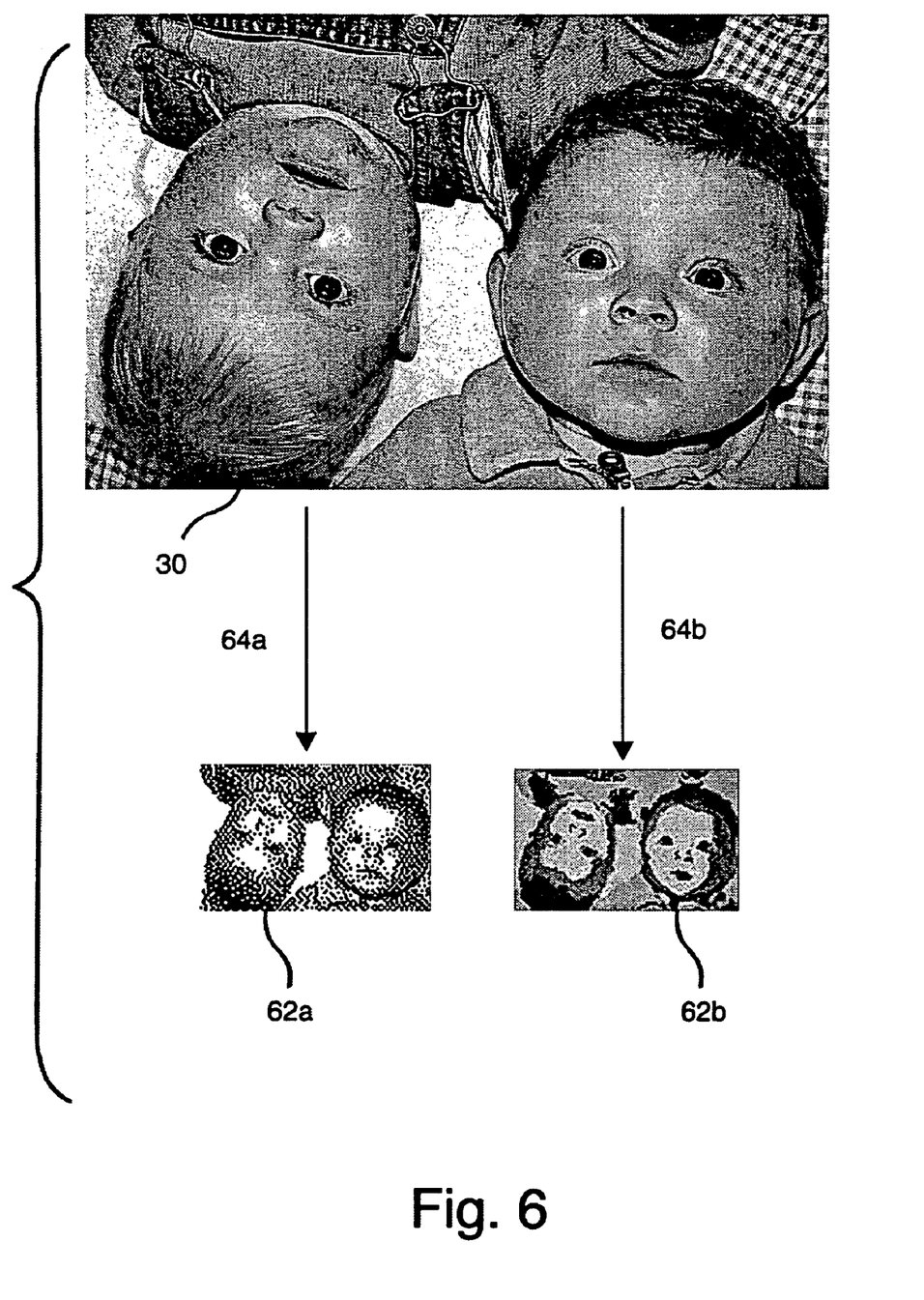
FIG. 6 depicts schematically a type of processing of a colour image which can be effected by a system according to the invention when the calculation power is very high.

A description will now be given succinctly of the server 10 containing the image database. In a simple and advantageous embodiment, the images recorded in this database have not only a relatively high first definition as depicted in FIGS. 3, 4 and 5 by the references 30, 40 and 50, but also "micro-images" or "vignettes" 32, 42 and 52, which have a relatively small number of pixels and which are associated with the image with the relatively high first definition. In the present application the term "vignette" means a degraded image of an original image where the number of pixels is less than approximately 192*128 and where the depth of colour is coded in approximately 4 bits. As will be understood from a reading of this patent application and as can be seen in FIG. 5, it is possible to associate several micro-images or vignettes 52b, 52v and 52r with each of the images having the first definition. For example, a "black and white" vignette, that is to say an image in which each pixel has only one value, a colour vignette, that is to say an image in which the pixels can have several values, one for each colour, each coded in for example 5 bits, or any other suitable vignette. Advantageously, the vignettes will have a limited number of pixels, for example 192×128.

A user who wishes to access, by means of his cellular telephone, an image contained in a database connected to the Internet sends a message in the appropriate protocol, for example WAP, to a telephone line. The message passes through a gateway 30 where it is converted into a message of the HTTP type (Internet) in order to arrive at a storage server 20.

Figure 2:
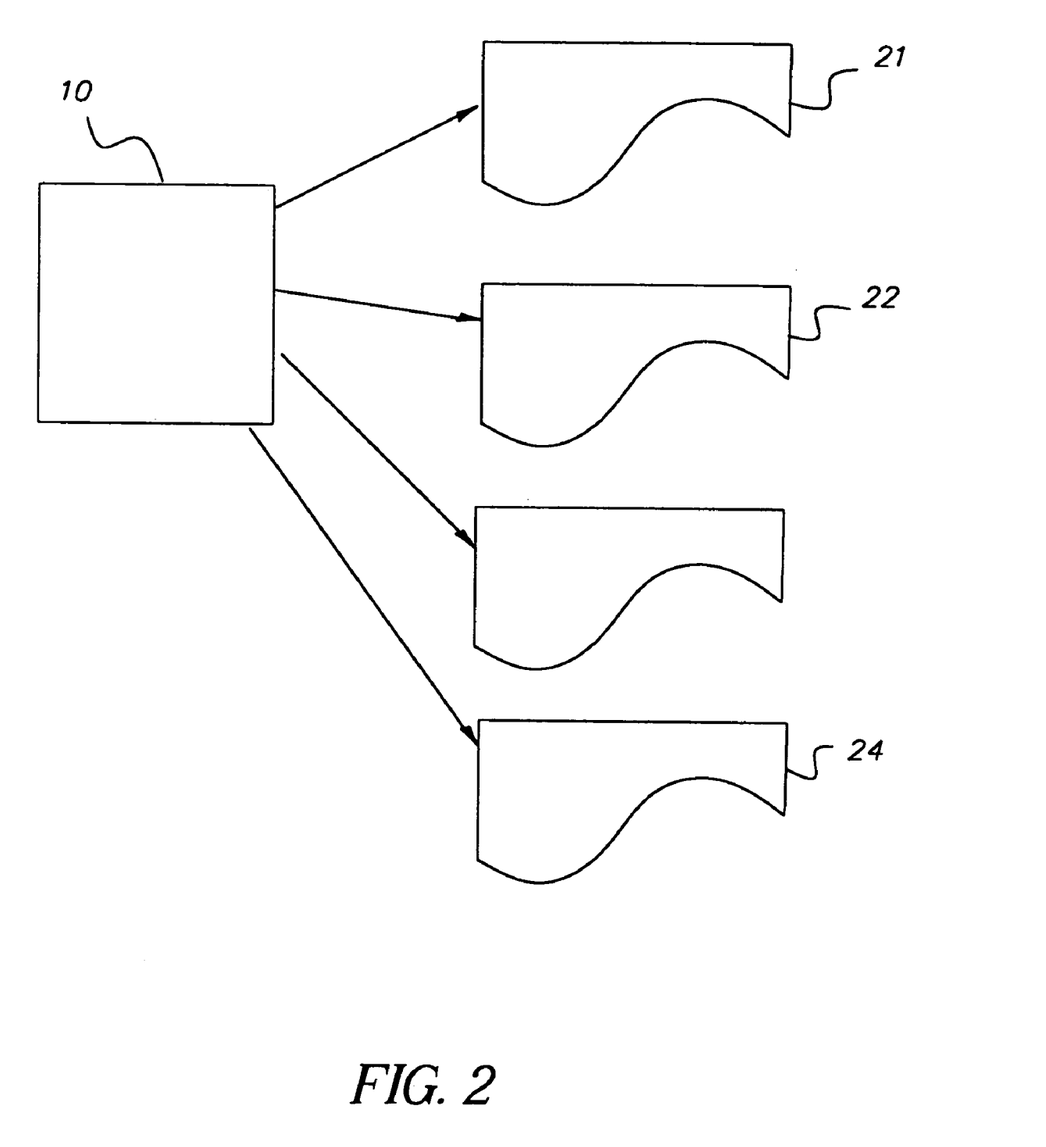
FIG. 2 depicts schematically some of the essential elements of the invention.

According to the invention, the storage server 20 is provided with a table 21 which makes it possible to recognize the type of equipment which sent the request. This is because the messages sent comprise a header containing not only the address but also the type of cellular telephone which is in communication with the server. Once the type has been identified, the server can determine, by means of data previously entered, for example in a table 22 or in a base connected to the server, the type of screen relating to the type of apparatus in communication with the server and in particular the number of pixels which can be displayed, the number of colours and the depth of colour which can be displayed.

On reception of a message requesting a connection, the server identifies the type of equipment with which it is in communication, and records this information for subsequent processing.

When a processed image is sent to a cellular telephone, the server applies a transformation 34a, 34b, 44, 54 or 64 to the digital file corresponding to the image to be sent in order to adapt the image to the definition of the screen in number of addressing pixels, number of colours and depths of colour. In this way, the image displayed on the screen is optimised and is more "understandable" for the recipient. In one embodiment it is possible to record on the server a monochrome or "black and white" vignette and a colour vignette. In a preferred embodiment, the one of the vignettes which corresponds to the demanded image and which is adapted to the type of display screen of the cellular telephone which sent the request will be transmitted. In particular, when the display screen is a monochrome screen of the on/off type, an image resulting from the "black and white" vignette will be transmitted.

Before transmission, a processing 34a, 34b, 44a, 44b, 54 or 64 will be applied to the vignette in order to adapt the number of pixels in the vignette to the number of pixels on the display screen as well as the depth of colour. Such transformations can be contained in a table 24. They make it possible to very rapidly send an appropriate representation of the image at relatively high definition, the majority of the processing being carried out previously. The adaptation of a vignette with several grey levels to an image with a depth of colour at two levels, that is to say a monochrome image, can be obtained by an algorithm of the "Floyd-Steinberg" type known to persons skilled in the art. It is obvious that, when the image processing speeds are sufficiently rapid, the adaptation of the image of relatively high definition to the type of screen, as can be seen schematically in FIG. 6, will not need to pass through the production of a vignette and can be obtained directly from the original image with a relatively high definition by means of a single composite transformation 64a or 64b depending on the original image and the type of screen which demanded the display of the image.

A description will now be given of a few examples of processing in order to obtain vignettes which can be displayed by cellular telephones or mobile devices whose screens have only a small number of pixels and whose depth of colour is limited.

FIG. 3 depicts schematically a first possible transformation 36.

When an image is introduced into the database, the server 10 triggers a processing in order to produce one or more vignettes 32, 42, 52 associated with the image having a relatively high definition. In one embodiment, the processing used consists of producing a histogram of the pixel values. When the distribution of the values used per channel, for example red, green or blue, is relatively monomodal and homogeneous, the vignette will for example be produced from the channel whose median is closest to the mean.

Another type of processing which can be applied to an image with a relatively high-definition consists of detecting the principal subject of the image in order to edit, on the small screen of the cellular telephone, only the important part of the image. To do this it is possible to use known techniques described for in example in the E.P.A 99204116.0 and in the documents cited therein or in U.S. application Ser. No. 09/490,915. As can be seen in FIG. 4, the principal subject contained in the image 40 is determined by means of an appropriate processing 45. Once the principal subject has been determined, the image is limited to the area containing the subject in order to obtain a reframed image 41, centred on the principal subject. A statistical analysis of the points on the image corresponding to the principal subject is carried out, and then an appropriate transformation 43 is applied, adapted to the type of subject, so as to optimise the image, for example for neutral balance and/or colour balance. In one advantageous embodiment, the transformed image is next recorded in the form of a colour vignette having a limited number of pixels. When the server receives an image transmission request, it then merely needs to determine the type of screen associated with the apparatus which sent the request, and to apply the appropriate transformation 44a or 44b in order to adapt the vignette to the screen and transmit the image thus processed.

Obviously other types of principal-subject recognition algorithms can be used. In particular, it is possible to use recognition of the presence of faces in the image based on techniques described for example in the article entitled "Neural Network Based Face Detection" published by IEEE TRANS PAMI, 20(1), 23–38 in the names of Rowley H., Balouja S. and Kanade T., or in U.S. application Ser. No. 09/112,661, whose functioning is based amongst other things on the detection of flesh colours. In one particularly advantageous embodiment, when the processing of the original image detects several faces with a given confidence range, the number of pixels representing each face is sufficient to enable the server 10 to create a specific vignette for this face. All these vignettes can be sent when there is a request for consultation of the corresponding image and displayed one after the other using an appropriate button on the receiving cellular telephone.

In another operating mode, when the original image does not have a "principal subject" within the image, in other words when the entire original image is itself the principal subject, for example an image of a landscape, the server processes the recorded image so as to create several vignettes associated with the original image. For example, a colour vignette 52c will be created by means of a processing 56c. It will simultaneously be possible to improve the original image automatically by means of an appropriate transformation 55, and then record in the form of a monochrome vignette, for example of the red, green and blue colour selection type, the images corresponding to the original image.

When a user wishes to display the corresponding landscape on his cellular telephone, the server will transmit the plurality of vignettes which are recorded in the buffer memory of the cellular telephone. The user will be able to select as required one or other of the images so as to mark the one which suits him best. It is obvious that, during transmission, the server 10 will transmit an adapted image file, by means of an appropriate processing 54c, 54b, 54v or 54r dependent on the type of display screen. In this way the display of the image received by the user will have been optimised.

In a particular embodiment and in the case where the type of equipment can display a succession of images sufficiently rapidly, the rapid sequential display of practically identical images can be envisaged, making it possible to increase the visual perception of the depth of colour of the screen due to the phenomenon of persistence of the retinal image.

It can happen that the display of an original colour image in a very "degraded" mode supplies, after the processing for its adaptation to the type of screen, an image which is practically unintelligible even for one who knows the original image. To avoid this type of display, an image detection system is provided which supplies a message of the "image not displayable" type in response to the detection of an excessively degraded display. The functioning of this detection system can for example be based on a statistical analysis of the spatial distribution of the pixels as a function of their value. For example, when the depth of colour is two and the statistical spatial distribution of the elements representing "black" is practically uniformly random, the system decrees that the image is not displayable and transmits the message in place of a file corresponding to the vignette.

Obviously the system according to the invention can be improved so as to permit the introduction and recording of data in the image data base of the server 10. Sound messages or written information can be associated in a known manner with each image in the base. This information can be not only titles, but also dates, photographing conditions, photographing places, or even key words which can be used subsequently to classify these images in distinct categories. It is obvious that it is also possible to use image classification programs for creating links between various images in the database and creating image categories. The conjoint use of the image categories and data or key words associated with the original image will facilitate subsequent navigation between the images in the base using the display device.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PART LIST | |
|---|---|
| 10 | server |
| 14 | link |
| 16 | arrow |
| 18 | arrow |
| 20 | Storage server |
| 21 | table |
| 22 | table |
| 24 | table |
| 29 | gateway |
| 30 | Image |
| 32 | vignettes |
| 34a | transformation |
| 34b | Transformation |
| 39 | Cellular telephone |
| 40 | Image |
| 41 | Reframed image |
| 42 | Vignette |
| 43 | Transformation |
| 44a | Transformation |
| 44b | Transformation |
| 45 | Processing |
| 50 | Image |
| 52 | Vignette |
| 52r | Vignette |
| 52v | Vignette |
| 52b | Vignette |
| 52c | Vignette |
| 54c | Vignette |
| 54r | Transformation or processing |
| 54v | Transformation or processing |
| 54b | Transformation or processing |
| 55 | transformation |
| 56c | Processing |
| 56a | Processing |
| 56v | Processing |
| 56b | Processing |
| 62a | Vignette |
| 62b | Vignette |
| 64a | Processing |
| 64b | Processing |

What is claimed is:

1. A method for displaying a digital image having a relatively high definition and contained in a database of a server on the screen of a display device, comprising the steps of:
    a) on request coming from the display device requiring the display of a digital image in the database, determining the type of screen associated with the display device on which the image will be received;
    b) before transmission, applying to the image to be transmitted, a transformation of the image definition, the transformation being a function of the type of display screen that has been determined in step a);
    c) transmitting the image modified by the transformation; and
    d) displaying this modified image on the screen of the display device;
    wherein at least two different images are transmitted to the display device, the images being sufficiently similar so as to increase the visual perception of grey levels by sequential alternating display of the distinct images received.

2. A method according to claim 1, wherein at least one vignette corresponding to the original image is associated with each image in the database.

3. A method for displaying a digital image having a relatively high definition and contained in a database of a server on the screen of a display device, comprising the steps of:
   a) on request coming from the display device requiring the display of a digital image in the base, determining the type of screen associated with the display device on which the image will be received;
   b) determining on the image at least one principal area of interest containing an object;
   c) detecting the characteristics of the object contained in said at least one principal area of general interest is detected to at least the area of principal interest;
   d) applying to at least the area of principal interest a transformation which is a function of the characteristics of the object in order to adapt the characteristics of the image of the object contained in said at least one area of principal interest to the given type of display screen, to at least the area of principal interest;
   e) applying to at least the area of principal interest a transformation which is a function of the definition of the given type of display screen in order to adapt the definition of the object contained in said at least one area of principal interest to the characteristics of the display screen;
   f) transmitting the image modified by the transformation; and
   g) displaying said area of principal interest on the screen of said given type.

* * * * *